July 20, 1965 L. POLAKOFF 3,195,216
MACHINE FOR TREATING FABRICS
Filed July 23, 1963 2 Sheets-Sheet 1
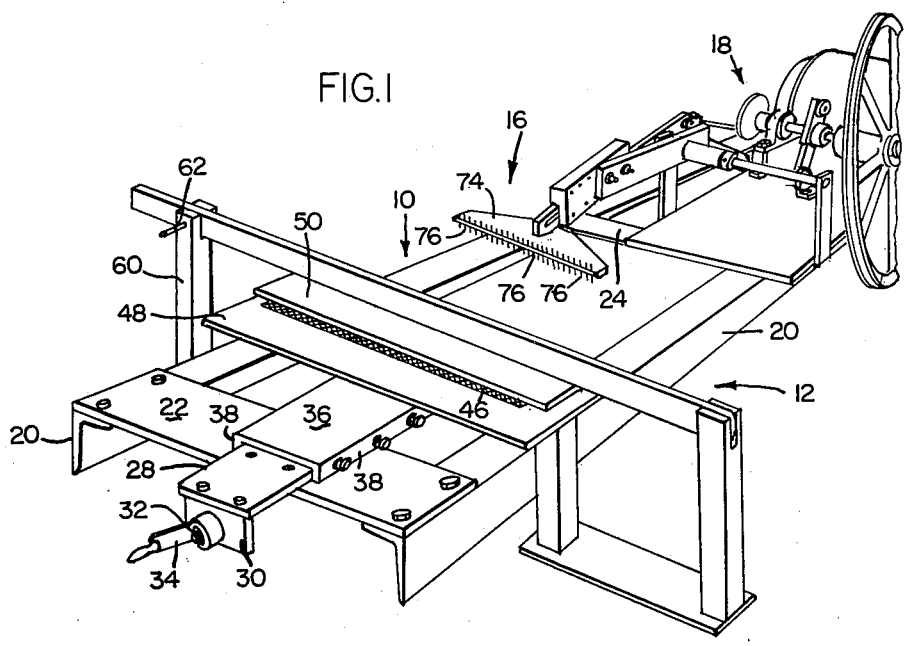
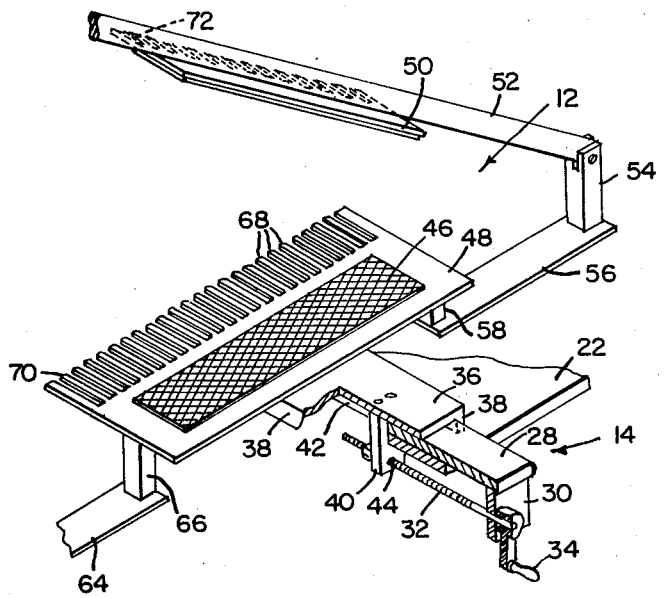
INVENTOR.
LOUIS POLAKOFF
BY
*Ezekiel Wolf, Wolf & Greenfield*
ATTORNEYS INVENTOR.
LOUIS POLAKOFF
BY
Ezekiel Wolf, Wolf & Greenfield
ATTORNEYS 3,195,216
MACHINE FOR TREATING FABRICS
Louis Polakoff, 82 Stanley Road, Waban, Mass.
Filed July 23, 1963, Ser. No. 297,020
11 Claims. (Cl. 28—18)

This invention relates to the manufacture of fabrics and more particularly comprises a new and improved machine for forming fringes in the edges of fabrics, after the fabrics are woven.

One important object of this invention is to provide a relatively inexpensive machine for removing threads running in one direction from the edge of a fabric so as to form fringes with the threads running in the other direction at the edge, without mutilating or otherwise adversely affecting the previously woven cloth.

Another important object of this invention to to provide a machine capable of removing threads from the edges of the finest and most delicate of fabrics without adversely effecting them in any way.

Still another important object of this invention is to provide a fringing machine which may be controlled either manually or automatically and which is capable of handling fabrics made of virtually all weights of thread.

To accomplish these and other objects the fringing machine of this invention includes among its features a frame about which is organized a clamp for holding the cloth to be treated, a circularly moving comb for picking off the threads at the edge of the cloth held by the clamp, and a mechanism for moving the cloth at the desired speed to feed the edge of the cloth into the path of the circularly moving comb so that one or a few threads may be picked from the cloth during each revolution. The frame also carries the drive means for the comb, which causes it to move in the circular path.

These and other objects and features of this invention along with its incident advantages will be better understood and appreciated from the following detailed description of one embodiment thereof, selected for purposes of illustration and shown in the accompanying drawings, causes it to move in the circular path.
in which:

FIG. 1 is a perspective view of a fringing machine constructed in accordance with this invention;

FIG. 4 is a fragmentary perspective view of the clamp of the machine; and

Figure 2:
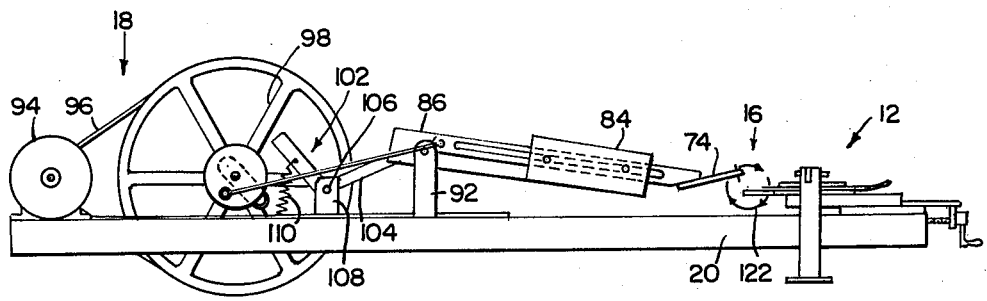
FIG. 2 is a side view of the machine shown in FIG. 1.

The fringing machine shown in the drawings includes in its general organization a frame 10 on which are supported a clamp 12, a clamp actuating mechanism 14, a comb 16 and a comb drive means 18. Each of these major parts of the device is described in detail below.

The frame 10 is composed of a pair of side rails 20 conveniently made of angle iron stock connected together by a platform 22 at the left end as viewed in FIG. 1 and a pair of ties 24 and 26 adjacent the center and other end of the rails, respectively.

The clamp 12 and the clamp actuating mechanism 14 are mounted on the platform 22. In FIGS. 1 and 4 a plate 28 is shown screwed, welded or otherwise secured to the upper surface of the platform 22, and the plate 28 carries at its front end a downwardly extending panel 30 on which is mounted screw shaft 32 forming part of the actuating mechanism 14 of the clamp. A crank handle 34 is secured to the end of the shaft which extends through the panel 30.

An inverted channel member 36 is slidably supported above the plate 28 with its flanges 38 in sliding engagement with the edges of the plate 28. The channel 36 carries a downwardly extending guide 40 that passes through a slot 42 provided in the plate 28 and platform 22, and the guide 40 is provided with a threaded opening 44 adjacent its lower end through which the screw shaft 32 extends. As the shaft 32 rotates it acts upon the guide 40 by virtue of the registration of the shaft threads with the threads of the opening 44 to move the channel 36 back and forth over the plate 28.

Rigidly secured to the upper surface of the channel 36 is a grate 46 carried in a frame 48, which forms part of the clamp 12. The grate 46 is composed of a number of pimple-like protuberances on its mesh surface to grip fabric pressed firmly against it. A rubber coated plate 50 carried on the pivotally supported arm 52 of the clamp serves to press fabric against the grate while being treated by the machine. The arm 52 is pivotally supported at one end on post 54 which in turn is connected to the frame 48 by plate 56 and inner post 58. The other end of the arm 52 releasably locks to the upper end of post 60 on the other side of the frame 10 by means of pin 62. The post 60 is connected to the grating frame 48 by means of a second horizontal plate 64 and second inner post 66. This arrangement is clearly shown in FIGS. 1 and 4.

The grating frame 48 is formed with a series of parallel teeth 68 that define slots 70 bearing a special relationship to the comb 16 described in detail below. A matching set of teeth 72 is formed on the rubber coated clamping plate 50, and the slots between the teeth 72 align with the slots 70 between the teeth 68 when the grate and rubber coated plate 50 lie in face to face relationship.

To secure cloth in place ready for treatment by the comb 16, the arm 52 is raised to the position shown in FIG. 4 by pulling the pin 62 from the openings in the post 60 and the end of the arm. The cloth is then placed over the grate 56 with the edge to be fringed lying above the teeth 68 on the grate frame 48. The arm 52 is then returned to the position shown in FIG. 1 and the pin 62 is inserted through the openings to lock the arm in place. The rubber coated plate 50 and the grate 46 cooperate to hold the cloth firmly in place without marring it. The compressive forces on the fabric applied by the rubber coated plate 50 and the grate are sufficient to resist movement even when the comb 16 pulls threads from the edge which lies between the rows of teeth 68 and 72.

The comb 16 includes a holder 74 which carries a number of needles or needle-like fingers 76 which preferably equal in number the slots 70 defined by the teeth 68 and which are adapted to move in a generally circular path. The needles 76 are preferably linearly arranged in a row as illustrated in FIG. 1. Preferably they are oriented in a plane generally normal to the plane assumed by the cloth C when held by the clamp or clamping member 12. Thus the needles 76 are designed to enter the edge of the cloth disposed between the teeth 68 and 72 along a line parallel to and behind transverse threads which are to be drawn from the cloth and pull these threads which run across those teeth from the cloth, while not disturbing those threads which run in a direction parallel to the teeth. The needles are made of steel or other material sufficiently strong to withstand the sheering forces applied to them and are capable of being sharpened to a point fine enough so that they do not mutilate the cloth.

Figure 3:
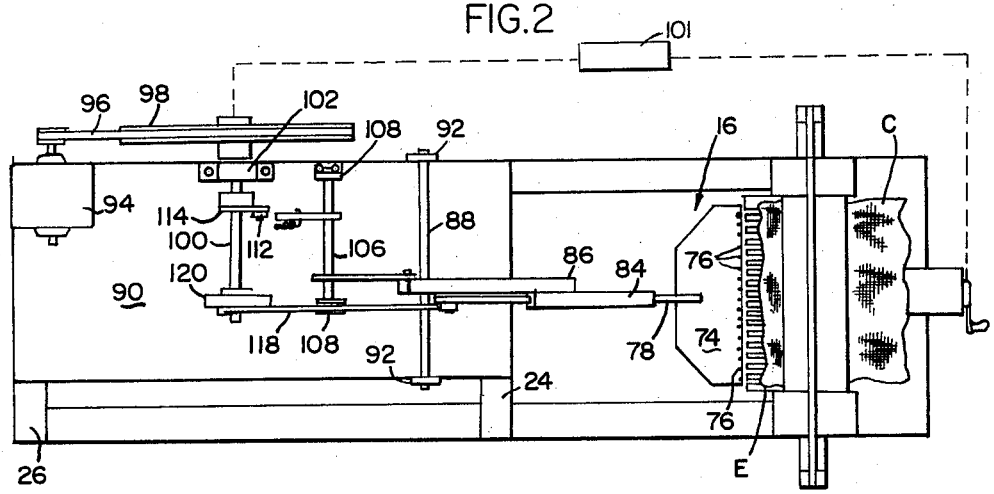
FIG. 3 is a top view of the machine shown in FIGS. 1 and 2.

The needle holder 74 is carried on the end of a slide 78 provided with an elongated slot 80 over a major portion of its length through which pins 82 extend and guide the movement of the slide 78. The pins 82 are carried by a block 84 provided with a slot for the slide 78, and the block in turn is carried on a pivotally supported arm 86. The arm 86 is pivotally supported on a shaft 88 which extends across the frame between the angles 20. In FIGS. 1 and 3 it will be noted that a table 90 which supports a major part of the drive means 18 for the comb sits on the cross members 24 and 26, and the table 90 also supports the posts 92 that carry the shaft 88.

Figure 5:
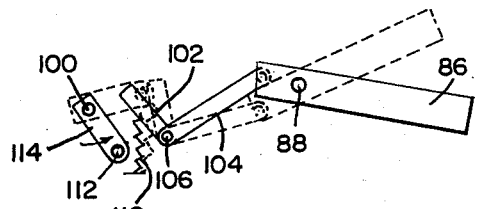
FIGS. 5 and 6 are fragmentary views showing details of the drive means for the comb.
Figure 6:
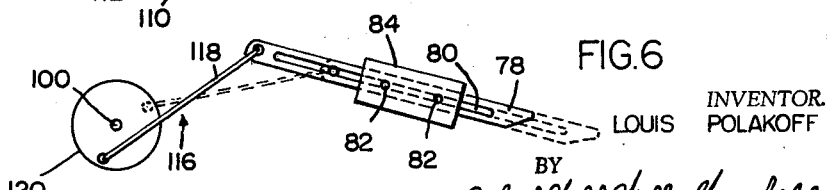

From the preceding description and the showing of FIGS. 5 and 6, it is evident that two separate motions may be introduced to the comb 16; namely, pivotal motion (generally upwardly and downwardly) by movement of the arm 86 on shaft 88, and translational motion (generally back and forth) by movement of the slide 78 in the block 84 carried on the arm 86. Both of these motions are introduced to the comb 16 by the drive means 18 supported on the table 90.

The drive means includes a motor 94 mounted on the table 90 above the cross member 26, which through a belt 96 turns fly wheel 98. A shaft 100 supported on bearings 102 physically carries and rotates with the fly wheel 98 and also carries a pair of actuators for the two motions imparted to the comb 16.

The pivotal motion of the arm 86 mounted on the shaft 88 is controlled by a pair of radius levers 102 and 104 each secured at one end to a shaft 106 mounted on bearings 108 supported on the table 90. The radius levers 102 and 104 are fixed to the shaft 106 and move with it. The other end of radius lever 104 is secured to the end of arm 86. The shaft 106 is biased to a counter-clockwise position as viewed in FIGS. 2 and 5 by a spring 110 secured at one end intermediate the ends of the lever 102 and at the other end to the table 90. The spring 110 acts in tension to pivot the lever 102 counter-clockwise as viewed in the drawings and in turn pivots the other lever 104 counter-clockwise so that its end connected to the end of the arm 86 urges that arm in a clockwise direction. Consequently the end of the arm 86 which supports the block 84 moves downwardly as viewed in FIGS. 2 and 5. This chain of mechanical connections is clearly illustrated in FIG. 5 wherein the biased position is shown in full lines. When the lever 102 is moved against the bias of the spring 110 to rotate the shaft 106 clockwise, the lever 104 lowers the left end of the arm 86 and causes its other end to rise as suggested in th broken lines in FIG. 5.

Actuation of the lever 102 against the bias of spring 110 is achieved by cam 112 carried on the end of arm 114 in turn carried on the shaft 100. As the shaft 100 rotates counter-clockwise as viewed in FIGS. 2 and 5, the cam 112 once during each revolution engages the free end of the lever 102 and moves it against the bias of the spring 110 to pivot the arm 86 from the position shown in full lines to that shown in broken lines in FIG. 5.

The motion of the slides 78 illustrated in FIG. 6 is achieved by means of a crank 116 composed of a connecting rod 118 and wheel 120. The wheel 120 is secured to and rotates with the shaft 100, and the connecting rod 118 is connected at one end to the periphery of the wheel 120 and at the other end to the left end of the slide 78 as viewed in FIGS. 2 and 6. As the wheel 120 rotates counter-clockwise with the shaft 100 the rod 118 moves the slide 78 from the position shown in full lines to that shown in broken lines and then returns it to the position shown in full lines once during each revolution of the shaft 100.

In FIG. 2 the resulting path of motion imparted to the combs 16 is suggested by the arrow 122. It will be noted that the circular path traced by the comb causes the comb to move forward and downward, and rearward and upward, with the needles 76 passing through the slots 70 defined by the teeth 68. Thus from the position shown in FIG. 2 the comb 16 moves forward and down so that the needles 76 pass between the teeth and subsequently the needles move rearwardly away from the clamp 12.

From the foregoing description of the several parts of the machine, its operation should be apparent. In FIG. 3 a piece of cloth C is shown clamped between the grate 46 and the rubber coated plate 50. The forward edge E of the cloth which edge is to be fringed lies between the teeth 68 and 72 of the grate frame 48 and the rubber coated plate 50, respectively. The position of the clamp (and the cloth) may be adjusted by turning the handle 34 which rotates the screw shaft 32. The operator may manually adjust the position of the clamp so that the cloth C is in a position wherein needles 76 of the comb will pick off the first or outermost thread which traverses the clamp between the fingers 68 and 72. When the motor 94 is placed in operation the fly wheel 98 driven directly by the motor rotates the shaft 100 causing the two motions to be imparted to the comb, and the comb follows the path suggested by the arrows 122. With rotation of the comb the outermost transverse thread of the cloth will be picked off, and by slowly moving the cloth in the direction of the comb, additional transverse threads may be picked off one at a time. The distance the clamp 12 is moved by its actuating device 14 with each revolution of the comb 16 will of course be determined by the weight of the threads which comprise the cloth. With heavier threads the cloth should be moved a greater amount with each revolution of the comb, and with fabrics made of lighter thread each step movement of the clamp should be some lesser amount. When the machine is operated manually the operator continues to feed the cloth toward the comb by rotating the handle 34 until the fringe resulting from the removal of the transverse threads is of the desired length. When the desired length is achieved the operator need only reverse the direction of rotation of the handle 34 to back off the cloth from the comb.

While in the preceding description the clam 12 is described as being moved manually independent of the drive means 18 of the comb, it will be appreciated that rotation of the screw shaft 32 may be keyed to rotation of the shaft 100 so that the cloth is fed automatically toward the comb 16 as each successive transverse thread is picked off. By using a single input for rotation of the shafts 32 and 100 operation of the separate parts may be readily synchronized. This is suggested in FIG. 3 wherein the shafts 32 and 100 are shown to be mechanically linked through a gear box 101 so that each of the shafts is driven through the fly wheel by motor 94.

From the foregoing description it will be appreciated that with the machine of this invention, even delicate fabrics can be fringed without becoming stretched, frayed or otherwise mutilated. The relatively simple machine may easily be serviced, and its minimum number of parts will give long trouble-free service. The machine is relatively small (limited primarily by the fabric size) and requires little power for its operation.

Because numerous modifications of this invention will occur to those possessing ordinary skill in the art, it is not intended that the breadth of this invention be limited to the specific embodiment illustrated and described. Rather, it is intended that the scope of this invention be determined by the appended claims and their equivalents.

What is claimed is:
1. A fringing machine comprising
   a frame,
   a clamping member secured to and movable on the frame, said clamping member being provided to hold a cloth to be fringed by the machine,
   a comb having a plurality of needles linearly arranged in a row and oriented generally normal to the plane assumed by the cloth held by the clamping member,
   means supporting said comb and needles for insertion into the cloth along a line parallel to and behind transverse threads to be drawn from the cloth,
   and drive means secured to the frame and carrying the comb for moving the comb through a repetitive cycle wherein the comb needles are simultaneously inserted behind and draw from the cloth held by the clamping member the transverse threads.

2. A fringing machine as defined in claim 1 further characterized by,
actuating means secured to the clamping member for moving the cloth toward the comb whereby successive transverse threads are reached by the comb as it continuously recycles.

3. A fringing machine comprising
a frame,
a clamp mounted on the frame for holding cloth to be fringed with the edge to be fringed exposed in the clamp,
a comb mounted on the frame and having a plurality of needles oriented generally normal to the plane of the cloth exposed in the clamp,
drive means connected to the comb for moving it in a generally circular path with the needles passing into the exposed portion of the cloth and then moving away from the cloth whereby transverse threads engaged by the comb needles are pulled from the cloth,
and means connected to the clamp for moving it relative to the circular path of the comb.

4. A fringing machine comprising
a frame,
a comb having a plurality of needles secured thereto,
an arm pivotally mounted on the frame and a slide movably mounted on the arm and carrying the comb,
drive means mounted on the frame and secured to the arm and slide for rocking the arm and moving the slide causing the comb to move in a generally circular path about a horizontal axis above the frame,
and clamping means mounted on the frame for holding cloth to be fringed with the edge to be fringed intersected by the path traveled by the comb when moved by the drive means whereby the needles of the comb pass into the edge of the cloth and pull from it transverse threads.

5. A fringing machine as defined in claim 4 further characterized by
said clamping means including a plurality of teeth supporting the edge of the cloth to be fringed and said teeth defining slots through which the needles of the comb extend and engage transverse threads in the cloth edge.

6. A fringing machine as defined in claim 5 further characterized by
said clamping means including a stiff grate and a yieldable plate between which the cloth is grasped.

7. A fringing machine as defined in claim 6 further characterized by
actuating means secured to the frame and the clamping means for moving the cloth progressively toward the circular path of the comb whereby the needles of the comb may be made to pass further into the edge of the cloth behind successive transverse threads.

8. A fringing machine as defined in claim 4 further characterized by
said drive means including a motor driven rotating shaft,
a rotating wheel carried by the shaft,
a connecting rod secured to the periphery of the wheel and the slide for reciprocating the slide on the arm,
a pair of radius levers pivotally mounted on the frame, one of said levers being connected to the arm for pivoting the arm when the lever moves,
and a cam carried on the shaft and engaging the other of radius levers causing the one of the levers to pivot the arm.

9. A fringing machine comprising
a frame,
means including a comb mounted on the frame and having a plurality of needle-like fingers which move in a generally circular path,
means including a clamp mounted on the frame for holding cloth to be fringed in the path of movement of the needles and with the transverse threads of the cloth disposed parallel to the axis of rotation of the needles whereby the needles pick off transverse threads,
and means for moving the clamp with the cloth and the comb path toward and away from each other.

10. A fringing machine comprising
a frame,
means including a comb mounted on the frame and having a plurality of needle-like fingers which move along paths in parallel planes,
means including a clamp mounted on the frame for holding cloth to be fringed normal to the parallel planes and intersecting the path whereby threads of the cloth lying transverse of the planes are engaged by and move from the cloth with the needles,
and means for moving the clamp with the cloth and the comb path toward and away from each other.

11. A fringing machine as defined in claim 2 further characterized by
means mechanically connecting the actuating means and the drive means for automatically synchronizing movement of the comb and the clamping member.

References Cited by the Examiner

UNITED STATES PATENTS

| 184,637 | 11/76 | Lincoln | 28—18 |
| 3,085,296 | 4/63 | Meinicke | 19—81 |

FOREIGN PATENTS

| 293,049 | 7/16 | Germany. |

DONALD W. PARKER, *Primary Examiner.*